(12) United States Patent
Fasoula et al.

(10) Patent No.: US 12,524,888 B2
(45) Date of Patent: Jan. 13, 2026

(54) METHOD FOR MORPHOLOGICAL PROCESSING OF MICROWAVE RADAR IMAGES IN THE MEDICAL FIELD USING DIFFERENT HYPOTHESES ON THE MEDIUM THROUGH WHICH THE MICROWAVE SIGNALS PASS

(71) Applicant: MVG Industries, Villejust (FR)

(72) Inventors: Agathi Fasoula, Villejust (FR); Luc Duchesne, Villejust (FR)

(73) Assignee: MVG Industries (FR)

( * ) Notice: Subject to any disclaimer, the term of this patent is extended or adjusted under 35 U.S.C. 154(b) by 320 days.

(21) Appl. No.: 18/289,416

(22) PCT Filed: May 4, 2022

(86) PCT No.: PCT/FR2022/050865
§ 371 (c)(1),
(2) Date: Nov. 3, 2023

(87) PCT Pub. No.: WO2022/234235
PCT Pub. Date: Nov. 10, 2022

(65) Prior Publication Data
US 2024/0412378 A1    Dec. 12, 2024

(30) Foreign Application Priority Data

May 4, 2021 (FR) ...................................... 2104690

(51) Int. Cl.
*G06T 7/155* (2017.01)
*A61B 5/00* (2006.01)
(Continued)

(52) U.S. Cl.
CPC ............ *G06T 7/155* (2017.01); *A61B 5/0507* (2013.01); *A61B 5/4312* (2013.01);
(Continued)

(58) Field of Classification Search
None
See application file for complete search history.

(56) References Cited

U.S. PATENT DOCUMENTS

2005/0107692 A1    5/2005  Li et al.
2013/0018591 A1*   1/2013  Grzegorczyk ......... G01N 22/00
                                                     702/19
(Continued)

FOREIGN PATENT DOCUMENTS

CN          111067524 A      4/2020

OTHER PUBLICATIONS

Khoshdel, Vahab, et al. "Full 3D microwave breast imaging using a deep-learning technique." Journal of Imaging 6.8 (2020): 80. (Year: 2020).*

(Continued)

*Primary Examiner* — Samah A Beg
(74) *Attorney, Agent, or Firm* — Lerner David LLP

(57) ABSTRACT

The invention relates to a method for processing medical images of human tissue of an area of a patient's body and in particular of the breast by means of a medical imaging device (1) comprising a microwave probe array consisting of K>1 probes spaced apart from one another, the array comprising P>1 different configurations defining transmitting probes and receiving probes for one or more position(s) around the area, in which the transmitting probes are configured to transmit microwave signals so as to illuminate an area of the body and the receiving probes are configured to receive microwave signals after scattering and reflection in the area, the probes being capable, in a complementary manner, of being configured to transmit and receive simultaneously.

9 Claims, 4 Drawing Sheets

(51) Int. Cl.
　　　*A61B 5/0507*　　(2021.01)
　　　*G06T 7/00*　　　(2017.01)
(52) U.S. Cl.
　　　CPC .. *G06T 7/0012* (2013.01); *G06T 2207/30068* (2013.01); *G06T 2207/30096* (2013.01)

(56) References Cited

U.S. PATENT DOCUMENTS

2019/0175095 A1* 6/2019 Bore .................. A61B 5/0507
2024/0412353 A1* 12/2024 Fasoula .................. G06V 10/25

OTHER PUBLICATIONS

Moloney, Brian M., et al. "The Wavelia Microwave Breast Imaging system-tumour discriminating features and their clinical usefulness." The British Journal of Radiology 94.1128 (2021): Sep. 7, 2021. (Year: 2021).*

International Search Report for Application No. PCT/FR2022/050865 mailed Sep. 22, 2022, pp. 1-3.

French Preliminary Search Report for Application No. FR 2104690 dated Dec. 3, 2021. pp. 1-2. [See p. 1, categorizing the cited references].

Sugitani, T. et al., "Complex permittivities of breast tumor tissues obtained from cancer surgeries" Applied Physics Letters, Jun. 2014, pp. 1-6, vol. 104, Issue 25.

Safdarian, N, et al., "Detection and Classification of Breast Cancer in Mammography Images Using Pattern Recognition Methods" Multidisciplinary Cancer Investigation, Oct. 2019, pp. 1-12, vol. 3, Issue 4.

Pertuz, S. et al., "Analysis of focus measure operators for shape-from-focus" Pattern Recognition, Elsevier Ltd, May 2013, pp. 1-18, vol. 46, Issue 5.

O'Loughlin, D. et al., "Focal quality metrics for the objective evaluation of confocal microwave images" International Journal of Microwave and Wireless Technologies, Cambridge University Press and the European Microwave Association, Jun. 2017, pp. 1365-1372, vol. 9, Issue 7.

Marengo, E.A. et al., Time—Reversal MUSIC Imaging of Extended Targets. IEEE Transactions on Image Processing, Aug. 2007, pp. 1967-1984, vol. 16, No. 8.

Lazebnik, M. et al., "A large-scale study of the ultrawideband microwave dielectric properties of normal breast tissue obtained from reduction surgeries" Physics in Medicine and Biology, IOP Science, Apr. 2007, pp. 2637-2656, vol. 52.

Hossain, M.D. et al., "Cancer Detection in Highly Dense Breasts Using Coherently Focused Time Reversal Microwave Imaging" IEEE Transactions on Computational Imaging, Aug. 2017, pp. 1-13, vol. 3, Issue 4.

Fasoula, A. et al., "Super-resolution radar imaging for breast cancer detection with microwaves: the integrated information selection criteria" 2019 41st Annual International Conference of the IEEE Engineering in Medicine and Biology Society (EMBC) Jul. 2019, pp. 1-7.

Devaney, A. J. "Time Reversal Imaging of Obscured Targets From Multistatic Data" IEEE Transactions On Antennas and Propagation, May 2005, pp. 1600-1610, vol. 53, No. 5.

Brito Silva, T. F. et al., "Classification of breast masses in mammograms using geometric and topological feature maps and shape distribution" Research on Biomedical Engineering, Jun. 2020, Springer, pp. 225-235, vol. 36.

* cited by examiner

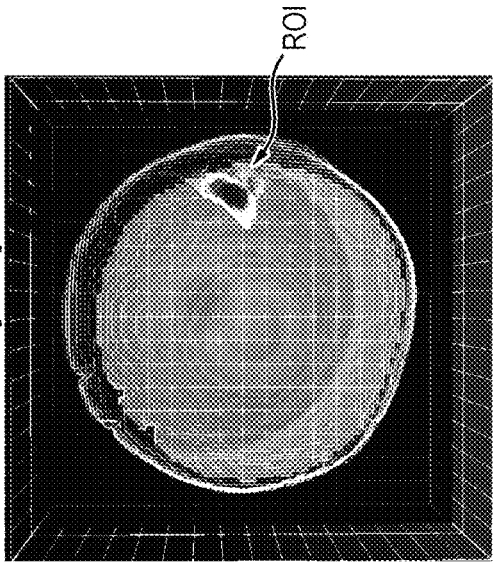
FIG. 4b Pcfib : [20:50]%
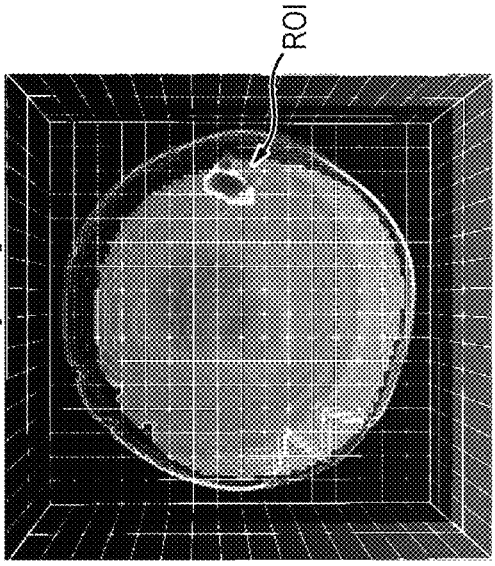
FIG. 4a Pcfib : [10:60]%
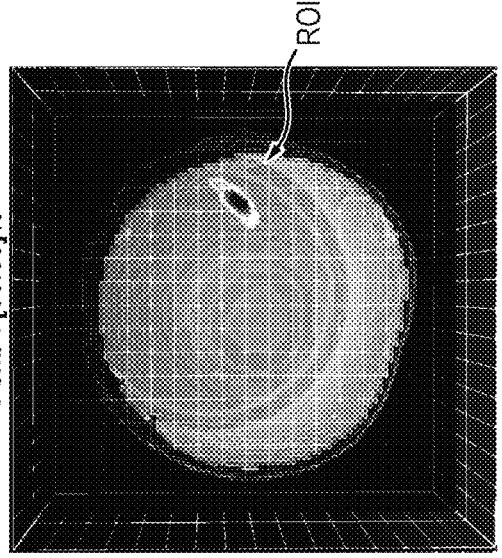
FIG. 4e Pcfib : [50:60]%
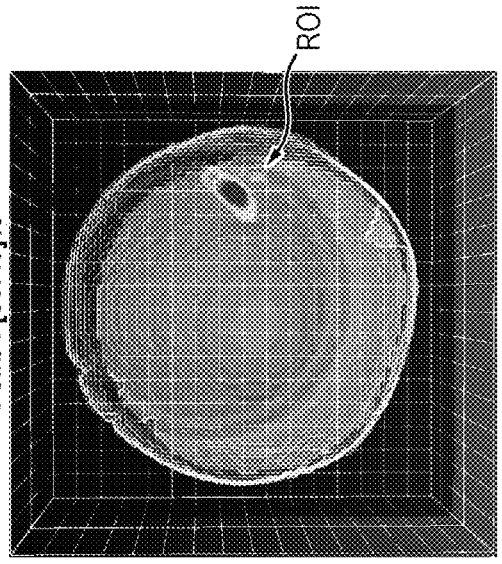
FIG. 4d Pcfib : [30:40]%
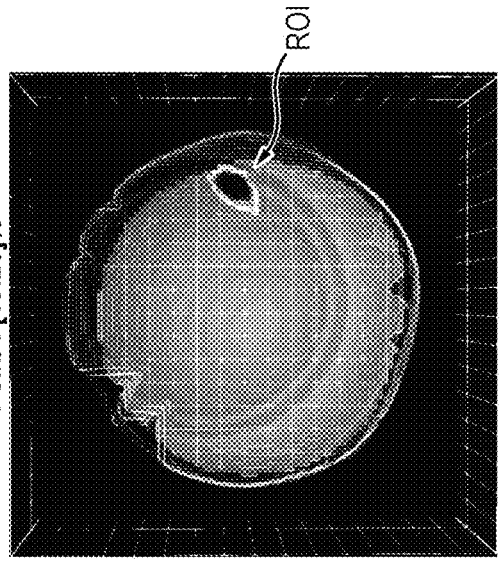
FIG. 4c Pcfib : [10:20]%

Pcfib : [20:50]%
ROI

Pcfib : [50:60]%
ROI

Pcfib : [10:60]%
ROI

Pcfib : [30:40]%
ROI

METHOD FOR MORPHOLOGICAL PROCESSING OF MICROWAVE RADAR IMAGES IN THE MEDICAL FIELD USING DIFFERENT HYPOTHESES ON THE MEDIUM THROUGH WHICH THE MICROWAVE SIGNALS PASS

CROSS-REFERENCE TO RELATED APPLICATIONS

The present application is a national phase entry under 35 U.S.C § 371 of International Application No. PCT/FR2022/050865 filed May 4, 2022, which claims priority from French Application No. 2104690 filed May 4, 2021, all of which are hereby incorporated herein by reference.

TECHNICAL FIELD

The invention relates to the field of medical imaging using electromagnetic waves in the microwave frequency band and more particularly concerns the medical imaging for the analysis of human tissues or organs permeable to electromagnetic waves. And the invention finds particular application in breast imaging and detection of breast pathologies.

STATE OF THE ART

Microwave imaging techniques make it possible to image human organs permeable to electromagnetic waves and are promising techniques in the field of breast imaging and detection of pathologies such as breast cancers.

The microwave imaging implements emission probes configured to illuminate all or part of the organ to be imaged by means of electromagnetic waves. The emitted waves pass through the area to be imaged and are received by reception probes. The probes can, in a complementary manner, be configured to emit and receive simultaneously. The received waves passed through the area to be imaged by having undergone reflections on the obstacles encountered, at the locations of dielectric contrasts (for example a cancerous lesion located in healthy tissues). All of the transmission coefficients thus measured between the emitting probes and the receiving probes form a multistatic acquisition. These multistatic acquisitions serve as input to radar imaging processing modules and make it possible to obtain a 2D or 3D radar image of the organ or part of the organ.

To obtain images that best represent the area to be imaged, it is necessary to know a priori the dielectric medium along the different paths traveled by the electromagnetic waves between the emission probes, each point of the considered area to be imaged, and the reception probes.

However, this a priori knowledge of the dielectric properties of the organs to be imaged is not accessible and requires making assumptions on the traversed medium, which leads to images that can be of poor quality.

DISCLOSURE OF THE INVENTION

The invention makes it possible to improve the quality of the radar images for the analysis of human tissues or organs. Particularly, the invention makes it possible to detect in the radar images one or several regions of interest which correspond to physical objects that may constitute lesions.

To this end, the invention proposes, according to a first aspect, a method for processing medical images of human tissues of an area of the body of a patient and particularly of the breast by means of a medical imaging device comprising an array of probes emitting/receiving electromagnetic waves in the microwave range consisting of K>1 probes spaced from each other, the array comprising P>1 different configurations defining emitting probes and receiving probes for one or several positions around the area, in which the emitting probes are configured to emit microwave signals so as to illuminate an area of the body and the receiving probes are configured to receive microwave signals after diffusion and reflection into the area, the probes being able, in a complementary manner, to be configured to emit and receive simultaneously, the method comprising the following steps implemented in a processing unit of the medical imaging device:

acquiring the signals produced in P>1 configurations of the array of antennas;

the method comprising for each configuration:
processing the signals acquired for N>1 sets of $A_i>1$ values, $1 \leq i \leq N$, of a parameter characteristic of the human tissues traversed by the signals, so as to obtain $\Sigma_{i=1}^{N} A_i$ elementary microwave radar images;

selecting in each of the N sets according to at least one image focusing criterion, an elementary microwave radar image, each selected elementary image corresponding to one of the values of the parameter (pcfib) of the set; one elementary image per set being selected for a configuration;

the method comprising for each set:
reconstructing, from the selected elementary radar images, each of the configurations of a radar image of the body area of a patient so as to reconstruct one 3D radar image per set;

morphologically processing each reconstructed radar image so as to obtain a morphological image on which one or several regions of interest, if existing, that may constitute lesion(s), are identified assessing the persistence of each region of interest on the different morphological images obtained in order to morphologically validate the region of interest.

The invention is advantageously supplemented by the following characteristics, taken alone or in any one of their technically possible combinations:

the morphological processing consists in determining the solidity of one or several pixel regions of the image, a region of interest being identified if the associated solidity is greater than a threshold.

at least N=2 sets are considered, preferably at least N=3 sets of $A_i>1$ values, $1 \leq i \leq N$, of characteristic parameter (pcfib) of the medium traversed by the signals.

the sets totally or partially overlap in terms of variation ranges and/or in terms of values.

the assessment of the persistence consists in determining a percentage of presence of a region of interest on the morphological images, a region of interest being validated for a percentage greater than a threshold.

the array of probes comprises K>1 probes disposed around the area to be imaged, said array being movable in vertical positions around the area to be imaged, each configuration being an angular sector of probes each composed of M>1 probes with M<K, each configuration being angularly offset by at least one probe relative to another configuration; for each sector, each of the probes is in emission alternately so as to produce the signals acquired for the configuration, an elementary radar image being determined for each angular sector per set of characteristic parameter values.

The invention proposes, according to a second aspect, a computer program product comprising program code instructions for the execution of the steps of the method according to the first aspect of the invention, when this method is executed by at least one processor.

The invention proposes, according to a third aspect, a medical imaging device comprising a processing unit configured to implement a method according to the first aspect of the invention.

The combination of several configurations and the use, as assumptions, of several characteristic values of the traversed medium makes it possible to manage the heterogeneity of the dielectric properties not known a priori of the area to be imaged.

Furthermore, the persistence of a region of interest identified morphologically for at least B>1 sets among N sets (with B/N≤1) implies a validation of the region of interest, that is to say a strong probability that it corresponds to a physical object/lesion present in the imaged area versus an artifact.

In a complementary manner, the solidity criterion used is a shape descriptor which allows advantageous morphological identification of the regions of interest.

PRESENTATION OF THE FIGURES

Other characteristics, aims and advantages of the invention will emerge from the following description, which is purely illustrative and not limiting, and which should be read in relation to the appended drawings in which:

FIG. 1 schematically illustrates a microwave medical imaging system according to one embodiment of the invention;

FIG. 4a, FIG. 4b, FIG. 4c, FIG. 4d, FIG. 4e illustrate morphological images of the breast of a patient, obtained by means of a method for morphologically processing microwave radar images according to 'invention.

In all the figures, similar elements bear identical references.

DETAILED DESCRIPTION

Figure 1:
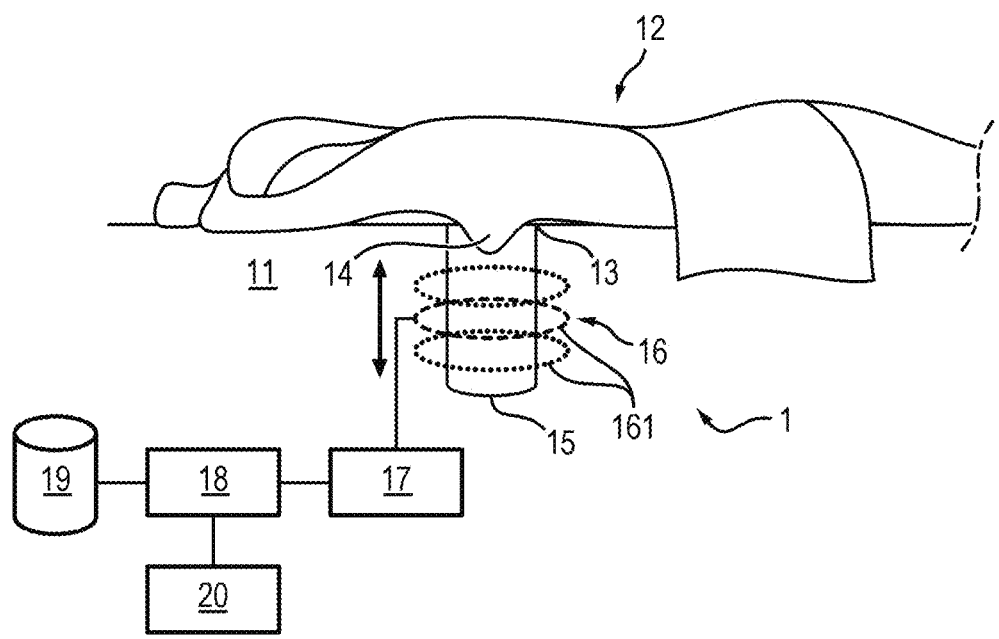

FIG. 1 illustrates a microwave medical imaging device 1 comprising an examination table 11 on which a patient 12 is lying. Particularly, the patient 12 is lying in a prone position. The examination table 11 comprises a preferably circular opening 13 allowing the immersion of the breast 14 of the patient in a tank 15 filled with a biocompatible transition liquid whose dielectric properties are optimized to improve the transmission of the electromagnetic waves to the interior of the breast.

An array 16 of electromagnetic wave emission/reception probes 161 in the microwave range (hereinafter schematized by dashes) is disposed around the tank 15 and makes it possible in emission to illuminate the observed medium and in reception to receive the signals reflected from the scene to be imaged. The probes 161 are advantageously evenly distributed around the tank and preferably in a ring surrounding the tank as illustrated in FIG. 1. Advantageously, the probes are configured to emit signals in the frequency band 0.5-6 GHz.

More generally, the imaging system operates in a multistatic manner and makes it possible to illuminate the medium to be imaged by using several probes in emission and several probes in reception and in different configurations around the medium to be imaged. The probes can, in a complementary manner, be configured to emit and receive simultaneously.

At each multistatic acquisition, all or part of the medium to be imaged is illuminated successively by preselected probes which operate in emission. The probes in emission of the array and their number are chosen according to the area of the breast to be imaged. For each probe that emits, the signal is received by preselected probes which operate in reception. The probes in reception of the array and their number are chosen according to the area of the breast to be imaged. It is then considered that each multistatic acquisition corresponds to a series of signal emissions/receptions by probes in a determined configuration.

By configuration it is thus meant the definition of a set of emission probes and the definition of a set of reception probes making it possible to perform a multistatic acquisition of all or part of the breast, these probes being disposed in a certain way in the space around the breast.

To switch from one configuration to another and to control the different multistatic acquisitions, the system comprises a unit 17 for controlling the array of probes which is connected to a monitoring and processing unit 18 (for example a processor and/or a calculator). Such a monitoring and processing unit 18 is configured to control the array, carry out the acquisitions, ensure the storage of the acquired data, perform radar imaging processing operations and implement a morphological image processing method which will be described below. A storage unit 19 makes it possible to store all of the acquired multistatic data and a certain number of data that can be used for the steps of the imaging processing or produced by the imaging processing. Furthermore, a display unit 20 makes it possible to display and view images obtained. The monitoring and processing unit 18, the storage unit 19 and the display unit 20 can be integrated directly into the imaging apparatus or physically moved. The imaging processing operations can be carried out a posteriori (off-line).

As will be understood, to image the entire breast, several successive configurations of emission probes and reception probes are defined. These configurations of emission probes and reception probes cover different areas of the breast to be imaged and are chosen so as to ultimately encompass the entire breast to be imaged.

For each configuration, the multistatic acquisitions of the transmission coefficients between the emission probes and the reception probes make it possible, after radar imaging processing, to obtain an elementary radar image.

All of the elementary images obtained make it possible to reconstruct a 2D or 3D radar image of the imaged area, here the breast. For the radar processing of the multistatic emission/reception signals allowing the reconstruction of the 2D or 3D radar images, it will be for example possible to refer to the following publications:

A. J. Devaney, Time reversal imaging of obscured targets from multistatic data, IEEE Trans. Antennas Propag. (2005). doi:10.1109/TAP.2005.846723;

Marengo, E. A.; Gruber, F. K.; Simonetti, F. Time-reversal MUSIC imaging of extended targets. IEEE Trans. Image Process. 2007, 16, 1967-1984. doi:10.1109/TIP.2007.899193;

Hossain, M. D.; Mohan, A. S. Cancer Detection in Highly Dense Breasts Using Coherently Focused Time-Reversal Microwave Imaging. IEEE Trans. Comput. Imaging 2017, 3, 928-939. doi:10.1109/TCI.2017.2737947;

A. Fasoula, B. M. Moloney, L. Duchesne, J. D. G. Cano, B. L. Oliveira, J. Bernard, M. J. Kerin, Super-resolution radar imaging for breast cancer detection with microwaves: the integrated information selection criteria, in: 41st Annu. Int. Conf. IEEE Eng. Med. Biol. Soc., 2019.

The 2D or 3D radar images obtained are advantageously used as part of a processing method which will be described below.

As mentioned in the introduction, the determination of each elementary radar image requires in theory to know a priori the dielectric medium of the breast (that is to say of the traversed medium) along the path traveled between each emission probe and each reception probe. But this is not accessible.

As will be described, the invention implements a pcfib parameter which corresponds to an assumption on the average constitution of the medium traversed by the electromagnetic wave in the breast (or more generally, the imaged area) in terms of dielectric permittivity. This pcfib parameter corresponds to a percentage of mixture of fibro-glandular tissues and adipose tissues of the breast. For example pcfib=30% corresponds to a medium containing 30% fibro-glandular tissues and 70% adipose tissues. The dielectric properties of the breast tissue are then defined as a weighted average (weighting by pcfib) of the dielectric properties of the fibro-glandular tissues and adipose tissues. For examples of values of the dielectric permittivities of the fibro-glandular tissues and adipose tissues of the breast, it will be for example possible to refer to the following publications:

T. Sugitani, S. I. Kubota, S. I. Kuroki, K. Sogo, K. Arihiro, M. Okada, T. Kadoya, M. Hide, M. Oda, T. Kikkawa, Complex permittivities of breast tumor tissues obtained from cancer surgeries, Appl. Phys. Lett. (2014). doi:10.1063/1.4885087;

M. Lazebnik, L. McCartney, D. Popovic, C. B. Watkins, M. J. Lindstrom, J. Harter, S. Sewall, A. Magliocco, J. H. Booske, M. Okoniewski, S. C. Hagness, A large-scale study of the ultrawideband microwave dielectric properties of normal breast tissue obtained from reduction surgeries, Phys. Med. Biol. (2007). doi:10.1088/0031-9155/52/10/001.

Figure 2:
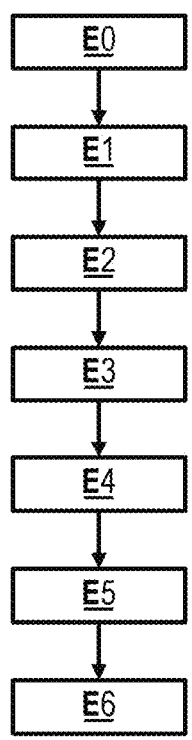
FIG. 2 illustrates steps of a method for morphologically processing microwave radar images according to the invention.

A method for morphologically processing microwave radar images is described below in relation to FIG. 2.

Firstly, P>1 configuration(s) of the probe array (step E0) is defined, so as to be able to encompass the entire breast to be imaged and to subsequently reconstruct a 3D radar image of the breast.

Then for each configuration, a multistatic acquisition of the transmission coefficients measured between the emitting probes and the receiving probes is carried out (step E1). There are then several multistatic acquisitions (P>1 multistatic acquisitions).

Then, the signals acquired for each configuration are processed in order to obtain elementary microwave radar images for each of the configurations (step E2).

Particularly, to process these signals, several sets (N>1 sets) of Ai values (Ai>1 values, with $1 \leq i \leq N$) of the pcfib parameter are considered. There are then $\Sigma_{i=1}^{N}$ Ai values of pcfib parameter per configuration. Thus, there are obtained from the signals of each multistatic acquisition $\Sigma_{i=1}^{N}$ Ai elementary microwave radar images each having been obtained for a value of the pcfib parameter. The idea here is to obtain elementary images according to different assumptions on the medium traversed by the electromagnetic waves.

Advantageously, the sets of values of the pcfib parameter overlap totally or partially in terms of variation and/or in terms of values.

For example, it is possible to have a set comprising the values 10%, 20% and another set comprising the values 5%, 15%, 25%. In this example there is a set whose values vary between 10% and 20% and another set whose values vary between 5% and 25%. These two sets therefore have a common variation range between 10% and 20%.

In another example, it is possible to have a set comprising the values 10%, 20% and another set comprising the values 20%, 25%, 30%. In this example, the sets have a value in common, 20%.

In yet another example, it is possible to have a set comprising the values 10%, 20%, 25% and another set comprising the values 5%, 10%, 30%. In this example, these two sets have a common variation range between 10% and 25% and a common value 10%.

At least two sets of values of the pcfib parameter are considered, one set of which may have a wider range of variation of the values of the pcfib parameter than the range of variation of the other set. Here, the terms wide and narrow are relative terms which are understood by comparing the variation ranges. The idea here is to have overlap between the sets of values.

The choice of the ranges of variation of the pcfib parameter for the different sets is made in relation to the existing variability in terms of compositions and density of the breasts.

Advantageously, wide variation ranges lead to images comprising a more complete representation of the region of interest and the narrow variation ranges potentially lead to partial representations of the detectable lesions.

For example, in the context of breast imaging, N=5 sets of variation can be chosen:
three sets with narrow variation ranges:
between 10% and 20%, the pcfib parameter taking for example the following values in this range: 10%, 15%, 20%
between 30% and 40%, the pcfib parameter taking for example the following values in this range: 30%, 35%, 40%
between 50% and 60%, the pcfib parameter taking for example the following values in this range: 50%, 55%, 60%
two sets with wide variation ranges:
between 20% and 50%, the pcfib parameter taking for example the following values in this range: 20%, 25%, 30%, 35%, 40%, 45%, 50%
between 10% and 60%, the pcfib parameter taking for example the following values in this range: 10%, 15%, 20%, 25%, 30%, 35%, 40%, 45%, 50%, 55%, 60%.

For each configuration, an elementary microwave radar image is selected for each set (step E3) and corresponds to one of the values of the parameter (pcfib) of the set; for each configuration, one elementary image per set is therefore selected. Such a selected image may contain a region of interest corresponding to a physical object potentially a lesion: such a selected image may contain a region of interest corresponding to a physical object potentially a lesion. In the previous example, there are then five elementary images per configuration (one elementary image per set) which will be used for the reconstruction.

Such a selection consists in particular in using at least one of the image focusing criteria (image focusing metrics) such as, for example, the criteria described in the following documents (a combination of several criteria can be used):

S. Pertuz, D. Puig, M. A. Garcia, Analysis of focus measure operators for shape-from-focus, Pattern Recognit. (2013). Doi:10.1016/j.patcog.2012.11.011.

O'loughlin, D.; Krewer, F.; Glavin, M.; Jones, E.; O'halloran, M. Focal quality metrics for the objective evaluation of confocal microwave images. Int. J. Microw. Wirel. Technol. 2017, 9, 1365-1372. Doi: 10.1017/S1759078717000642.

Each selected image may contain one or several regions of interest, which selection is performed according to at least one image focusing criterion. Indeed, the selection is made by means of one or several focusing criteria. For example, for a chosen criterion, this involves selecting the image which gives, for example, the minimum metric value, among all the others for this criterion.

It is noted that from one configuration to another, the selection of the elementary image for the same given set may have been performed with different values of the pcfib parameter belonging to this set.

From the elementary images obtained for the different configurations, a 2D or 3D radar image of the imaged area is reconstructed for each of the sets (step E4). Thus, there is a radar image reconstructed per set of pcfib values.

On each microwave radar image thus reconstructed of the imaged area, a morphological processing is applied so as to detect regions of interest, if existing (step E5). The result obtained is an image called microwave morphological image containing no, one or several identified regions of interest. Such morphological processing consists in particular in identifying the connected objects in the image by using a thresholding method and in retaining as regions of interest the connected objects which correspond to a set of morphological characteristics, in particular, the volumetric size of the connected object, the level of solidity of the connected object, the level of intensity inside the connected object, the level of contrast between the intensity inside the connected object and the intensity inside other connected objects potentially identified in the same image. At this stage, there are then several morphological images of the breast, each morphological image being obtained per set of pcfib values; each morphological image containing none, one or several identified regions of interest.

Preferably, the morphological processing is based on the solidity criterion. The solidity is calculated as the ratio between the volume of the object and the volume of the convex hull of the object. In general, the more the solidity of a region of interest increases, the more this region of interest will be "filled" (region of interest without holes), the more it will have a well-defined and convex contour and therefore the more significant probability it will have to correspond to a mass. In the case of breast imaging, this solidity criterion may be intended to support the differentiation between a breast mass and focal asymmetry ("islet" of normal breast tissue, without a defined convex outer border). This notion of a well-defined and convex contour of a solid breast mass is, for example, explained in the following publications:

T. F. de Brito Silva, A. C. de Paiva, A. C. Silva, G. Braz Júnior, J. D. S. de Almeida, Classification of breast masses in mammograms using geometric and topological feature maps and shape distribution, Res. Biomed. Eng. (2020). doi:10.1007/s42600-020-00063-x;

N. Safdarian, M. Hedyezadeh, Detection and Classification of Breast Cancer in Mammography Images Using Pattern Recognition Methods, Multidiscip. Cancer Investig. (2019). doi:10.30699/acadpub.mci.3.4.13.

In practice, the solidity of a region of interest must exceed a given level so that this region of interest can be identified in a morphological image of a given set.

Then, the persistence of each previously identified region of interest is assessed on the different morphological images. The objective is to morphologically validate the regions of interest which are persistent for several assumptions on the medium traversed by the electromagnetic waves (step E6). By assessing the persistence it is meant having on several morphological images the presence of a region of interest located in 3D in the same area. Here, it will be assessed whether regions of interest identified by the morphological processing are found on several images in the same area. Such an assessment consists in particular in using criteria such as, for example, spatial clustering criterion to associate the detected regions of interest together.

The persistence therefore makes it possible to morphologically validate the region of interest, that is to say its association with a physical object if the region of interest is present on a determined proportion of the number of morphological images.

As indicated, advantageously, at least two sets of pcfib values and preferably at least three sets of pcfib values are considered. This is important for implementing the persistence assessing step. Indeed, a region of interest will be considered as valid if it is persistent over several morphological images. In the case of two sets, for the region of interest to be valid, it must be present on both images. In the case of three sets, for the region of interest to be valid, it must be present on two images out of three or three images out of three.

Generally speaking, it will be considered that a region of interest is persistent if it is present on at least a percentage of morphological images which must be defined according to the type of region sought.

These regions of interest thus validated by means of the persistence then have a high probability of corresponding to a real lesion or tumor, rather than to an artifact for example. This persistence can be associated with a degree of confidence at the level of the detection.

In a complementary manner, it is considered that the imaging system comprises a horizontal circular array of K>1 measuring probes placed around a cylinder made of dielectric material. The circular array has the possibility of moving along the vertical axis. The organ under test (breast) is placed in the cylinder and is therefore surrounded by this array. A dielectric transition medium contained in the cylinder where the breast is placed makes it possible to optimize the penetration of the electromagnetic waves emitted by the probes inside the breast. The vertical positions of the array are predefined, with constant or variable distance intervals between each position, and cover the vertical extent of the breast.

Multistatic measurements are carried out for each of the vertical positions of the array of probes.

As an example of implementation of the acquisition step, L>1 angular sectors each composed of M>1 probes of the array of probes (M<K) are considered. For example L=18 angular sectors of M=6 probes with, in this case, each sector angularly offset relatively to each other by R=1 probe along the periphery of an array of K=18 probes.

For each of the angular sectors of M=6 probes, each of the probes is in emission alternately, and for each emitting probe, the other probes of the angular sector successively receive the signal corresponding to the echoes coming from the obstacles encountered, in particular in the breast. All the transmission coefficients measured between the emitting probes and the receiving probes of the angular sector considered form a multistatic acquisition. This multistatic acquisition is repeated for the set of L=18 angular sectors of M=6 probes. Then, the vertical array is moved by an interval along the vertical axis and the multistatic measurements are repeated again for the different angular sectors.

A configuration of the array then corresponds to an angular sector at a given vertical position. The acquisitions per angular sector make it possible to go around the breast by making several assumptions on the pcfib values at each angular sector at each vertical position. This makes it possible to optimally take into account the variable and heterogeneous structure of the breast in terms of dielectric properties which can change according to the different observation positions and to reveal the non-uniform angular response of the breast lesions.

Thus, we take advantage of the sectorization of the area to be imaged in combination with the different assumptions on the pcfib parameter to improve the detection of the regions of interest.

Types of Images Obtained With the Invention

Figure 3:
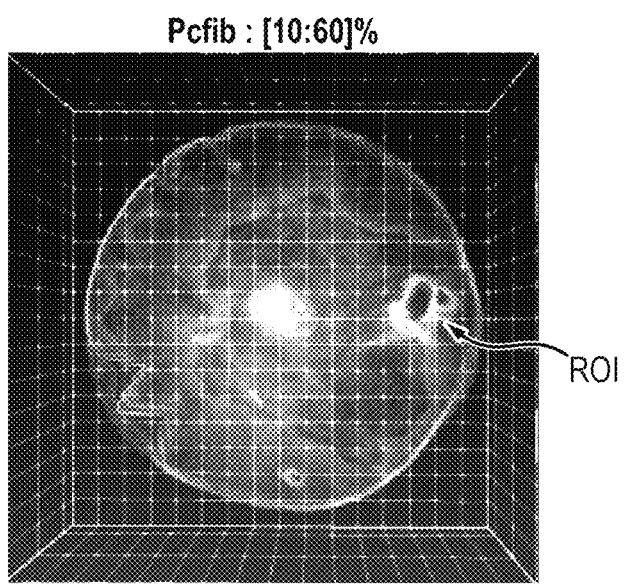
FIG. 3 illustrates a microwave radar image obtained during a method according to the invention.
Figure 5B:
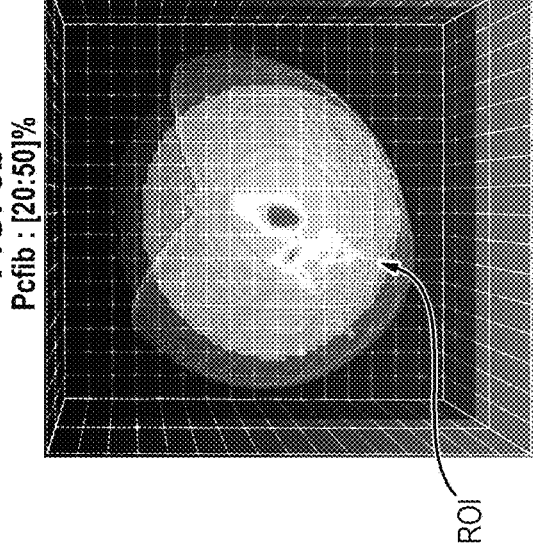
FIG. 5a, FIG. 5b, FIG. 5c, FIG. 5d illustrate morphological images of the breast of a patient, obtained by means of a method for morphologically processing microwave radar images according to the invention.
Figure 5D:
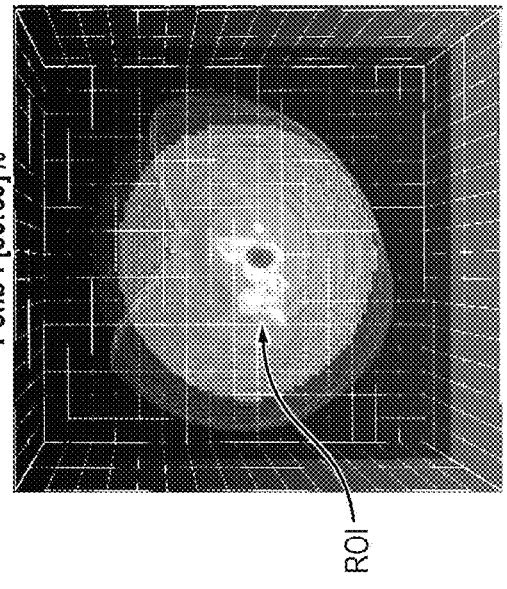
Figure 5A:
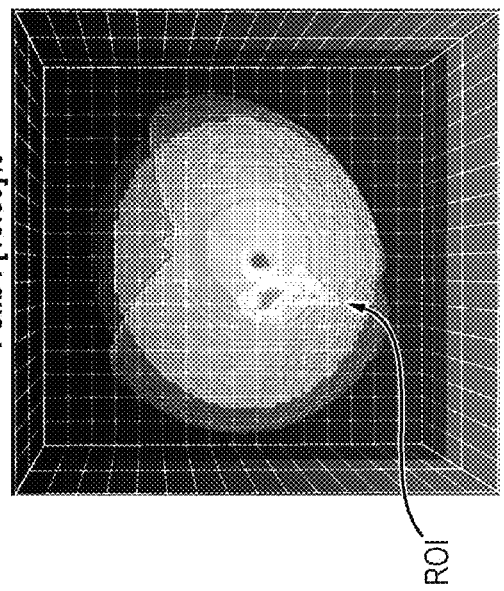
Figure 5C:
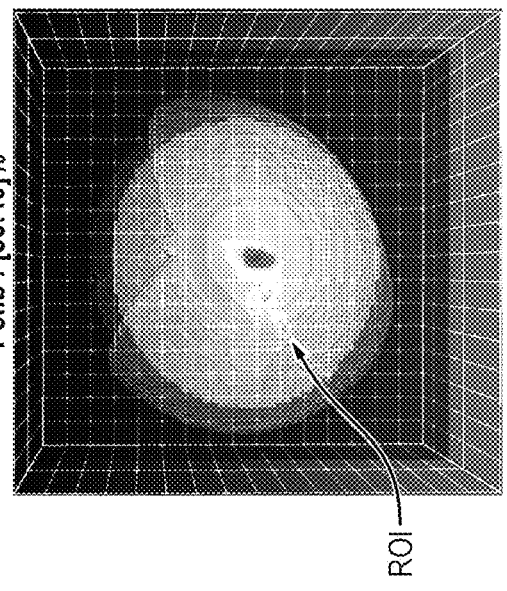

FIG. 3 illustrates a reconstructed microwave radar image for a set of pcfib values such as 10%≤pcfib≤60%. This radar image is represented in the coronal view of the breast. On this radar image, several regions of pixels emerge in terms of intensity.

The objective of the morphological processing is to process this type of radar images to identify regions of interest that could correspond to suspicious areas.

FIGS. 4a, 4b, 4c, 4d and 4e illustrate several morphological images of a patient's breast, obtained after morphological processing of the reconstructed microwave radar images for five sets of values of the pcfib parameter. These morphological images are represented in the coronal view of the breast. In this example, the morphological images correspond to five sets of values for the pcfib parameter:

FIG. 4a: 10%≤pcfib≤60%
FIG. 4b: 20%≤pcfib≤50%
FIG. 4c: 10%≤pcfib≤20%
FIG. 4d: 30%≤pcfib≤40%
FIG. 4e: 50%≤pcfib≤60%

In the light of the radar image in FIG. 3, the morphological processing made it possible to identify only one region of interest. This region of interest is persistent on the five morphological images and is therefore validated.

It is observed that on each morphological image, the identified region of interest has different contours, which confirms that the microwave radar signature of the detected object varies depending on the considered sets of the pcfib values.

FIGS. 5a, 5b, 5c and 5d illustrate morphological images of the breast of another patient obtained after morphological processing of the reconstructed microwave radar images also for five sets of values of the pcfib parameter. These five sets of values are identical to those considered in the case of the previous figures (the previous patient). In this example, the morphological processing made it possible to identify a single region of interest that was persistent on four of the five morphological images. This region of interest is therefore validated. The fifth morphological image corresponding to the set of the values 10%≤pcfib≤20% is not represented because no persistent region of interest has been identified there. Unlike the previous example, the identified region of interest is in the form of a constellation but which remains the same and only connected object according to the previously applied processing operations. This illustrates that the microwave radar signature of the detected object varies very significantly depending on the considered sets of the pcfib values. The region of interest corresponds to a lesion with a distributed, very uneven shape and a highly heterogeneous texture.

The invention claimed is:

1. A method for processing medical images of human tissues of an area of the body of a patient and particularly of the breast by means of a medical imaging device comprising an array of probes emitting/receiving electromagnetic waves in the microwave range consisting of K>1 probes spaced from each other, the array of probes comprising P>1 different configurations defining emitting probes and receiving probes for one or several positions around the area, in which the emitting probes are configured to emit microwave signals so as to illuminate an area of the body and the receiving probes are configured to receive microwave signals after diffusion and reflection into the area, the probes being able, in a complementary manner, to be configured to emit and receive simultaneously, the method comprising the following steps implemented in a processing unit of the medical imaging device:
acquiring the signals produced in P>1 configurations of the array of probes;
the method comprising for each configuration:
processing the signals acquired for N>1 sets of Ai>1 values, 1≤i≤N, of a parameter (pcfib) characteristic of the human tissues traversed by the signals, so as to obtain $\Sigma_{i=1}^{N} Ai$ elementary microwave radar images;
selecting in each of the N sets according to at least one image focusing criterion, an elementary microwave radar image, each selected elementary image corresponding to one of the values of the parameter of the set; one elementary image per set being selected for a configuration;
the method comprising for each set:
reconstructing, from the selected elementary radar images, each of the configurations of a radar image of the body area of a patient so as to reconstruct one 3D radar image per set;
morphologically processing each reconstructed radar image so as to obtain a morphological image on which one or several regions of interest, if existing, that may constitute a lesion, are identified,
assessing the persistence of each region of interest on the different morphological images obtained in order to morphologically validate the region of interest.

2. The method according to claim 1, wherein the morphological processing consists in determining the solidity of one or several pixel regions of the image, a region of interest being identified if the associated solidity is greater than a threshold.

3. The method according to claim 1, wherein at least N=2 sets of Ai>1 values, 1≤i≤N, of the characteristic parameter of the medium traversed by the signals are considered.

4. The method according to claim 3, wherein the sets totally or partially overlap in terms of variation ranges and/or in terms of values.

5. The method according to claim 1, wherein the assessment of the persistence consists in determining a percentage of presence of a region of interest on the morphological images, a region of interest being validated for a percentage greater than a threshold.

6. The method according to claim 5, wherein the array of probes comprises K>1 probes disposed around the area to be imaged, the array of probes being movable in vertical positions around the area to be imaged, each configuration being an angular sector of probes each composed of M>1 probes with M<K, each configuration being angularly offset by at least one probe relative to another configuration; for each angular sector, each of the probes is in emission alternately so as to produce the signals acquired for the configuration, an elementary radar image being determined for each angular sector per set of characteristic parameter values.

7. The method according to claim 1, wherein at least N=3 sets of Ai>1 values, 1≤i≤N, of the characteristic parameter of the medium traversed by the signals are considered.

8. A non-transitory computer program product comprising code instructions for the execution of the steps of the method according to claim 1, when the program is executed by at least one processor.

9. A medical imaging device comprising a processing unit configured to implement a method according to claim 1.

* * * * *